US009767705B1

(12) United States Patent
Klapuri et al.

(10) Patent No.: US 9,767,705 B1
(45) Date of Patent: Sep. 19, 2017

(54) SYSTEM FOR ESTIMATING USER'S SKILL IN PLAYING A MUSIC INSTRUMENT AND DETERMINING VIRTUAL EXERCISES THEREOF

(71) Applicant: Yousician Oy, Helsinki (FI)

(72) Inventors: Anssi Klapuri, Helsinki (FI); Mikko Kaipainen, Helsinki (FI); Chris Thur, Helsinki (FI)

(73) Assignee: YOUSICIAN OY, Helsinki (FI)

( * ) Notice: Subject to any disclaimer, the term of this patent is extended or adjusted under 35 U.S.C. 154(b) by 0 days.

(21) Appl. No.: 15/134,433

(22) Filed: Apr. 21, 2016

(51) Int. Cl.
*G04B 13/00* (2006.01)
*G09B 15/00* (2006.01)

(52) U.S. Cl.
CPC ....... *G09B 15/00* (2013.01); *G10H 2210/036* (2013.01); *G10H 2210/091* (2013.01); *G10H 2220/151* (2013.01)

(58) Field of Classification Search
CPC ....... G10H 2210/091; G10H 2210/395; G10H 2220/151; G10H 2240/135; G10H 2220/241
See application file for complete search history.

(56) References Cited

U.S. PATENT DOCUMENTS

| 2007/0243915 | A1* | 10/2007 | Egozy | G09B 5/06 463/7 |
| 2007/0245881 | A1* | 10/2007 | Egozy | G10H 1/0016 84/609 |
| 2010/0009750 | A1* | 1/2010 | Egozy | A63F 13/005 3/5 |
| 2011/0003638 | A1* | 1/2011 | Lee | G09B 15/00 463/35 |
| 2014/0033899 | A1 | 2/2014 | Dripps et al. | |
| 2014/0352520 | A1 | 12/2014 | Citron et al. | |

FOREIGN PATENT DOCUMENTS

WO 2012/146829 A1 11/2012

OTHER PUBLICATIONS

European Search Report issued in Application No. 17166747.0, dated Jun. 28, 2017.

* cited by examiner

*Primary Examiner* — Marlon Fletcher
(74) *Attorney, Agent, or Firm* — Young & Thompson

(57) ABSTRACT

A system for providing a user a virtual exercise in playing a music instrument relative to the user's skill characteristics includes: a processing entity and a memory entity for processing and storing data, respectively to execute the system functions, and a data transfer entity for receiving and transmitting data, the system configured to: obtain musical notation data, analyze it to assign the musical piece to which such data pertains a number of difficulty characteristics with scalar values, provide the user with a number of musical pieces, with known difficulty characteristics, as virtual exercises to be completed by playing an instrument, obtain user performance data of completed virtual exercises, analyze the user performance data to determine and assign the user with a number of skill characteristics values in accordance with the difficulty characteristic values of the completed musical pieces, and determine a musical piece for the user as a virtual exercise.

19 Claims, 5 Drawing Sheets

Figure 1:
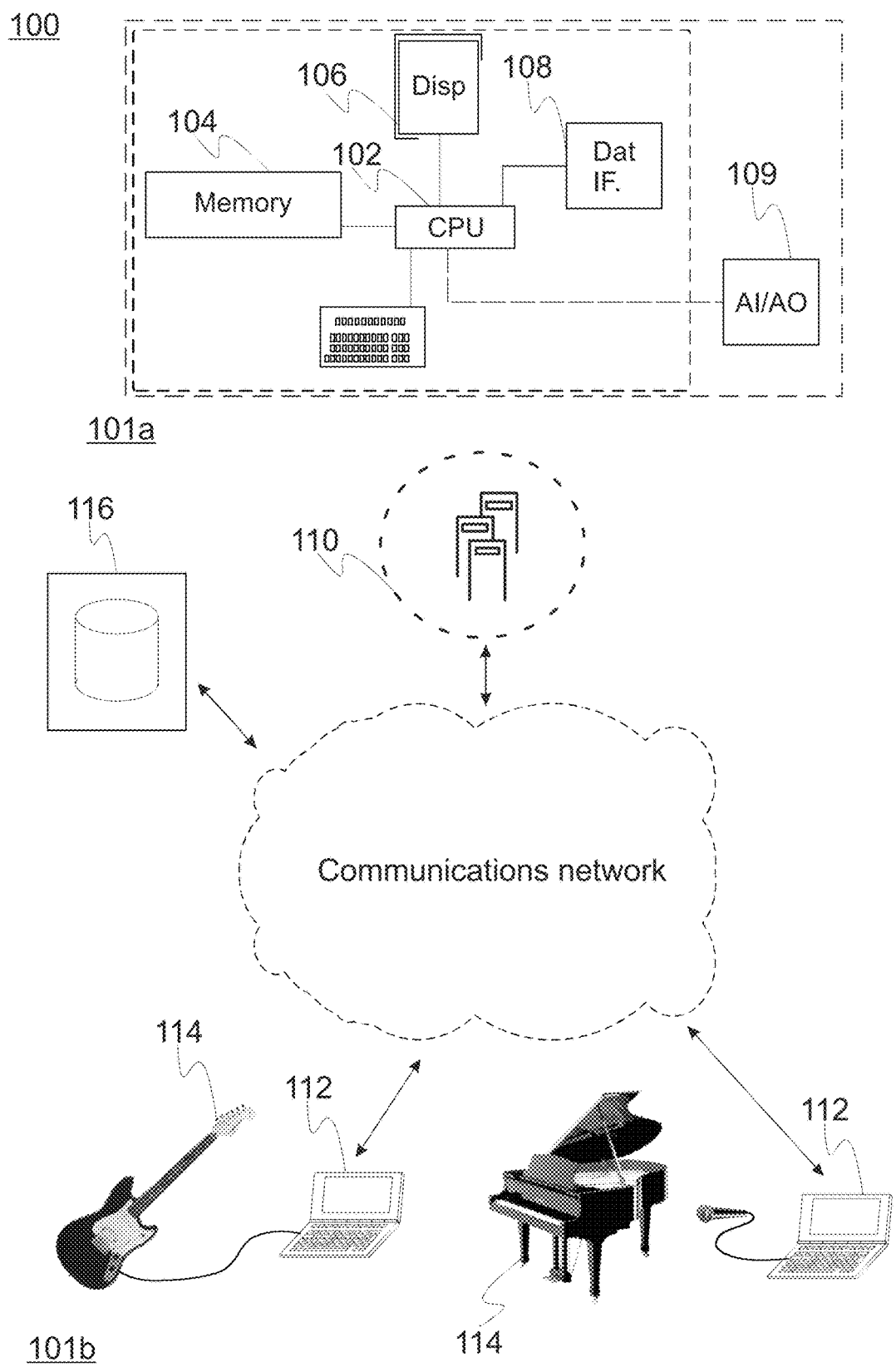

SYSTEM FOR ESTIMATING USER'S SKILL IN PLAYING A MUSIC INSTRUMENT AND DETERMINING VIRTUAL EXERCISES THEREOF

FIELD OF THE INVENTION

Generally the present invention relates to electronic arrangements and computing systems. Particularly, however not exclusively, the invention pertains to computing system for personalized musical instruction.

BACKGROUND

When studying to play a music instrument it is important to have high motivation. Commonly, beginners have high motivation in the beginning, but since repetitive practicing of tone sequences is required and the progress in learning is usually slow, a beginner often loses the inner motivation and stops practicing. As a result, it has been estimated that 85% of people that start playing a music instrument quit before they reach a reasonable skill level.

Nowadays, there exist few electronic arrangements that may be used to train a person to play a real instrument via virtual exercises. One of such arrangements is the "Yousician®" application, which allows for training of a real instrument utilizing personalized and session-based feedback to aid and teach the user to overcome their particular skill deficiencies. Some of the aspects of the solution are covered in the U.S. Pat. No. 9,218,748.

However, none of the existing applications or such computer implemented arrangements are able to estimate a user's proficiency to play a particular instrument. Instead, many just rely on an approach wherein the exercises gradually get more and more difficult as the user proceeds. However, people are different in what items they learn fast and what items are more difficult to learn. For example, in many prior art systems a user may get an acceptable score even if the user has difficulties in some specific items. When a fixed exercise program or randomly selected exercises are used, a user probably does not get enough practice in such items which are particularly difficult for the user. As a result, certain skills may remain poor despite the practice. People also tend to overestimate their current skills, which leads to selecting too difficult exercises, which leads to frustration and demotivation to practice further.

Further, many prior art solutions use predetermined exercises whose difficulty level and structure in terms of musical notation has been predetermined disallowing for the use of other songs that the user would enjoy the most, which enjoyment of the music itself is also an essential aspect for keeping up any user's motivation. Additionally, the users may rarely affect the type of songs that they practice and may hence have to actually practice songs that they don't like.

At best, offering the student appropriately difficult exercises facilitates the so called flow experience, described as
  being engaged in a challenging activity, but having the skills to meet that challenge,
  the sense of control, despite the task being challenging and perhaps unpredictable,
  concentration,
  transformation of time: a single task can seem to pass very slowly, but large amounts of time seem to fly past quickly.

The aforementioned aspects depict only a fraction of the existing problems with the prior art arrangements. It is however clear that although some arrangements give feedback on the user's mistakes and aim to gradually raise the difficulty of the exercises this is not done in relation to their current level of proficiency.

SUMMARY OF THE INVENTION

The objective of the embodiments of the present invention is to at least alleviate the aforementioned drawbacks evident in the prior art arrangements. The objective is generally achieved with a system in accordance with the present invention.

One of the main advantages of the present invention is that it allows for analyzing the difficulty of a song, assigning the song with a difficulty profile pertaining to the various difficulty aspects of the particular song and forming the song into a virtual exercise representation. Additionally, a user's skill characteristics in different areas of playing an instrument can be recognized and used to match with the determined difficulty characteristics of a song to match the user's skill characteristics with the musical composition's difficulty characteristics. This allows targeting a user with relevant exercise content, which both motivates and is enjoyable in terms of music preference. Hence, the user does not need to jump directly into practicing too difficult or too easy songs, but instead she gets to play exercises that are sufficiently close to her skill level to make the practice rewarding.

Another main advantage of the present invention is that it allows for determining a user's individual skill level in a particular aspect (or characteristic) of musical proficiency, such as rhythmic and instrument technique aspect, as opposed to estimating merely a vague overall skill level. In other words, by determining the user's skill characteristics objectively not only will it become possible to identify the particular skill in which the user needs to improve himself or herself but it is also possible to provide the user with virtual exercise content that is targeted at improving the particular skills.

Further advantage of the present invention is that it allows for continuous tracking of a user's skill characteristics and hence providing e.g. virtual exercises by gradually increasing their difficulty as the user progresses.

Even further, being able to determine a user's skill characteristics allows for finding other users with similar skill characteristic values. This in turn makes it possible to compare the performance data of such users, which may be used to revise the difficulty profile of songs. Also, users with similar skill characteristics may be connected for providing practice, feedback and song recommendations. Connecting together at least two users whose skill characteristics have been determined enables peer feedback and evaluation e.g. from the less skilled user by the more skilled one.

The proficiency of the user is presented with a number of skill characteristics which constitute a skill profile. The skill characteristics are assigned values which are comparable with the difficulty characteristic values of virtual exercises. The skill characteristics and difficulty characteristics may be presented as scalars whereas the skill profiles and difficulty profiles, which the characteristics respectively constitute, may be presented as e.g. vectors or matrices. Hence, the user is assigned a skill profile, whose components (skill characteristics) have values, which profile dictates the user's proficiency. Similarly, a musical piece, such as a song or a musical exercise, is assigned a difficulty profile, whose components (difficulty characteristics) have values, which profile dictates the piece's overall difficulty that is hence comparable with user proficiency (user profile). The different types of characteristics may be non-dependent from each other but corresponding types of skill and difficulty characteristics are comparable with each other.

In accordance with one aspect of the present invention a system for providing a user with a virtual exercise in playing a music instrument in relation to the user's skill characteristics comprising:
- a processing entity and a memory entity for processing and storing data, respectively to execute the system functions, and
- a data transfer entity for receiving and transmitting data, the system being thereby configured to:
  - obtain musical notation data, comprising an ensemble of features, such as notes, intervals and/or chords, pertaining to a musical piece,
  - analyze the obtained musical notation data to assign the musical piece, to which said data pertains, a number of difficulty characteristics with scalar values,
  - provide the user with a number of musical pieces, whose difficulty characteristics are known, as virtual exercises to be completed by playing an instrument,
  - obtain user performance data of completed virtual exercises,
  - analyze the user performance data to determine and assign the user with a number of skill characteristics values in accordance with the difficulty characteristic values of the musical pieces of the completed virtual exercises, and
  - determine a musical piece to be provided to the user as a virtual exercise in relation to the determined skill characteristics of the user.

According to an exemplary embodiment of the present invention analyzing the musical notation data comprises or is preceded by at least one item selected from the group consisting of:
- obtain user input of difficulty characteristics of the obtained at least one musical piece, said user input comprising user-assigned values of difficulty characteristics of rhythmic, melodic, harmonic or technical difficulty of said at least one musical piece,
- map the note/interval/chord/timing events, from the notes, intervals, chords and timing of the musical notation data, to features representing factors that affect song difficulty and that enable calculation of song difficulty,
- aggregate said user input and mapping to manual annotation of a musical piece,
- obtain a plurality of manually annotated musical pieces to learn a difficulty determination algorithm that estimates at least one difficulty characteristic of the musical piece, optionally in relation to the mapped features of said musical piece,
- assign at least one difficulty characteristic to a musical piece by extracting and/or mapping features from musical notation data pertaining to said piece, and utilizing difficulty determination algorithm to estimate at least one difficulty characteristic value.

According to an exemplary embodiment of the present invention the system memory comprises converting information for mapping the note/interval/chord/timing events, from the notes, intervals, chords and timing of the musical notation data, to mapped features.

According to an exemplary embodiment of the present invention the system comprises means for obtaining user performance data via an arrangement that comprises means for obtaining electric signals representing the user's playing on a musical instrument and comparing the obtained electric signals to the data pertaining to the virtual exercise.

According to an exemplary embodiment of the present invention the performance data comprises at least the success (accuracy) and/or mistakes (inaccuracies) in playing the presented number of virtual exercises. Said information of success and mistakes may be expressed as success rate and mistake rate of the user's playing in completing the virtual exercises.

According to an exemplary embodiment of the present invention the musical notation data is obtained from a database or in accordance with user input determines a musical piece to be presented to the user as a virtual exercise by selecting a musical piece that has at least one difficulty characteristic with lower, same or higher value as one of the user's corresponding skill characteristics said skill characteristic being chosen by the user.

According to an exemplary embodiment of the present invention the system determines a musical piece to be presented to the user as a virtual exercise by selecting a musical piece that has at least one difficulty characteristic with the same value as one of the user's corresponding skill characteristics.

According to an exemplary embodiment of the present invention the system determines a musical piece to be presented to the user as a virtual exercise by selecting a musical piece that has at least one difficulty characteristic with the same value as that of the user's corresponding skill characteristic with the lowest value.

According to an exemplary embodiment of the present invention the system determines a musical piece to be presented to the user as a virtual exercise by selecting a musical piece that has at least one difficulty characteristic with a higher value than the user's corresponding skill characteristic value.

According to an exemplary embodiment of the present invention the system determines a musical piece to be presented to the user as a virtual exercise by altering at least one difficulty characteristic of a musical piece to correspond to the user's corresponding skill characteristic value. This way e.g. the harmonic, melodic and rhythmic constitution and/or representation of songs may be altered to suit a particular user's skill characteristics. The system may provide the user with a virtual exercise by altering a musical score of a song in such a way as to achieve a desired level of difficulty in at least one of the difficulty characteristics.

According to an exemplary embodiment of the present invention the system determines a musical piece to be presented to the user as a virtual exercise by lowering the difficulty characteristics of a musical piece so that all of the difficulty characteristic values of said musical piece correspond to the user's corresponding skill characteristic values.

According to an exemplary embodiment of the present invention the musical piece is also assigned a genre characteristic, such as scalar pertaining to a particular genre.

According to an exemplary embodiment of the present invention the system is configured to obtain user input of the genres that the user prefers.

According to an exemplary embodiment of the present invention the musical piece to be presented to the user as a virtual exercise is determined in accordance with predetermined user-preferred genre characteristics.

According to an exemplary embodiment of the present invention the system is configured to collect historic performance data of performances of one musical piece, optionally from a plurality of users, to identify common mistakes, identifying features of a particular musical piece that have been performed correctly and features that have been performed incorrectly, to be used in revising the difficulty characteristics of the musical piece. Said historic performance data may comprise a plurality of analyzed performances of the particular musical piece.

According to an exemplary embodiment of the present invention the system is configured to provide the user with a skill test constituting a virtual exercise and comprising an ensemble of features, such as notes, intervals and/or chords presented to the user to be performed seemingly randomly according to an algorithm or semi-random picking from a large dictionary of manually crafted musical fragments.

According to an exemplary embodiment of the present invention the system is configured to determine a musical piece, from the analyzed musical notation data, to be presented as a virtual exercise to a plurality of users in relation to the determined difficulty characteristics of the musical piece and corresponding skill characteristics of the plurality of users.

According to an exemplary embodiment of the present invention the system is configured to execute the functions in a reciprocating manner to continuously, such as in intervals or real-time, determines, revises and/or improves the determined difficulty characteristics and skill characteristics to provide the user with relevant content.

The system extends to also many other feasible configurations to provide virtual exercises to the user in accordance with the determined difficulty and skill characteristics.

According to an exemplary embodiment the system comprises or constitutes a remote entity. The remote entity may communicate with electronic devices such as mobile devices and general purpose computers, which may be at least functionally connected with instruments, and used by users of the system. The remote entity may be used as a source and/or storage of graphical content and score statistics for the system. Further, the system allows the functions to be performed at and/or by an electronic device and/or at a remote entity. The functions may be also shared between the electronic devices and the remote entities.

Further, the system preferably comprises a visual user interface (UI) or audiovisual UI for obtaining user input and for providing output for the user, such as the musical piece and virtual exercise representation. Said interface may also constitute or comprise means for obtaining user performance data via an arrangement that comprises means for obtaining electric signals representing the user's playing on a musical instrument and comparing the obtained electric signals to the data pertaining to the virtual exercise. The UI may be also utilized to request the system to provide desired type of analysis and representations of data or phenomena underlying the data. The system may e.g. periodically or substantially continuously process the available data for keeping different intermediate analysis results and final analysis results up-to-date so as to enable latency-free exploitation thereof at the receipt of related input query provided via the UI.

In accordance with one aspect of the present invention a computer program product embodied in a non-transitory computer readable carrier or distribution medium comprising computer instructions that, when run on a computer, cause at least one processing entity to execute actions including:

obtain musical notation data, comprising an ensemble of features, such as notes, intervals and/or chords, pertaining to a musical piece, analyze the obtained musical notation data to assign the musical piece, to which said data pertains, a number of difficulty characteristics with scalar values, provide the user with a number of musical pieces, whose difficulty characteristics are known, as virtual exercises to be completed by playing an instrument, obtain user performance data of completed virtual exercises, analyze the user performance data to determine and assign the user with a number of skill characteristics values in accordance with the difficulty characteristic values of the musical pieces of the completed virtual exercises, and determine a musical piece to be provided to the user as a virtual exercise in relation to the determined skill characteristics of the user.

The previously presented considerations concerning the various embodiments of the system may be flexibly applied to the embodiments of the method and of the computer program product mutatis mutandis and vice versa, as being appreciated by a skilled person. Similarly, the provision and utilization of the system, method and computer program product are scalable in the limitations of the entities according to the system.

As briefly reviewed hereinbefore, the utility of the different aspects of the present invention arises from a plurality of issues depending on each particular embodiment.

The expression "a number of" may herein refer to any positive integer starting from one (1). The expression "a plurality of" may refer to any positive integer starting from two (2), respectively.

The term "musical notation" (also "score") refers to written music e.g. in one of the widely used forms such as common music notation or tablatures. Musical notation allows a musician to perform (play) a piece of music: to render the musical notation into audible sound signal using a musical instrument.

The term "musical notation data" refers to data that may be analyzed, altered and/or presented to the user via any feasible graphical user interface (GUI) means. The data may comprise code pertaining to notation, tablature and other textual and/or graphical means that may be construed as notes, intervals, chords, etc., optionally constituting a musical piece, to be produced on an instrument.

The terms "musical instrument" and "instrument" both refer to a musical instrument and are herein used interchangeably.

The term "song" is used herein to refer to musical pieces (musical compositions) that may be represented with musical notation and played by an instrument including the human voice.

The term "exercise" refers to a song represented for repetition and/or to be played to help a student or user to learn to play a musical instrument. Further the term "virtual exercise" is used to refer to an exercise provided via an electronic device and often via graphical user interface (GUI).

The term "exemplary" refers herein to an example or example-like feature, not the sole or only preferable option.

The term "user" is often used herein to refer to a user of the system and in many instances is synonymous with a player of an instrument or person studying music (student) utilizing the system.

Different embodiments of the present invention are also disclosed in the attached dependent claims.

BRIEF DESCRIPTION OF THE RELATED DRAWINGS

Next, some exemplary embodiments of the present invention are reviewed more closely with reference to the attached drawings, wherein FIG. 1 illustrates an embodiment of the system in accordance with the present invention.

Figure 2:
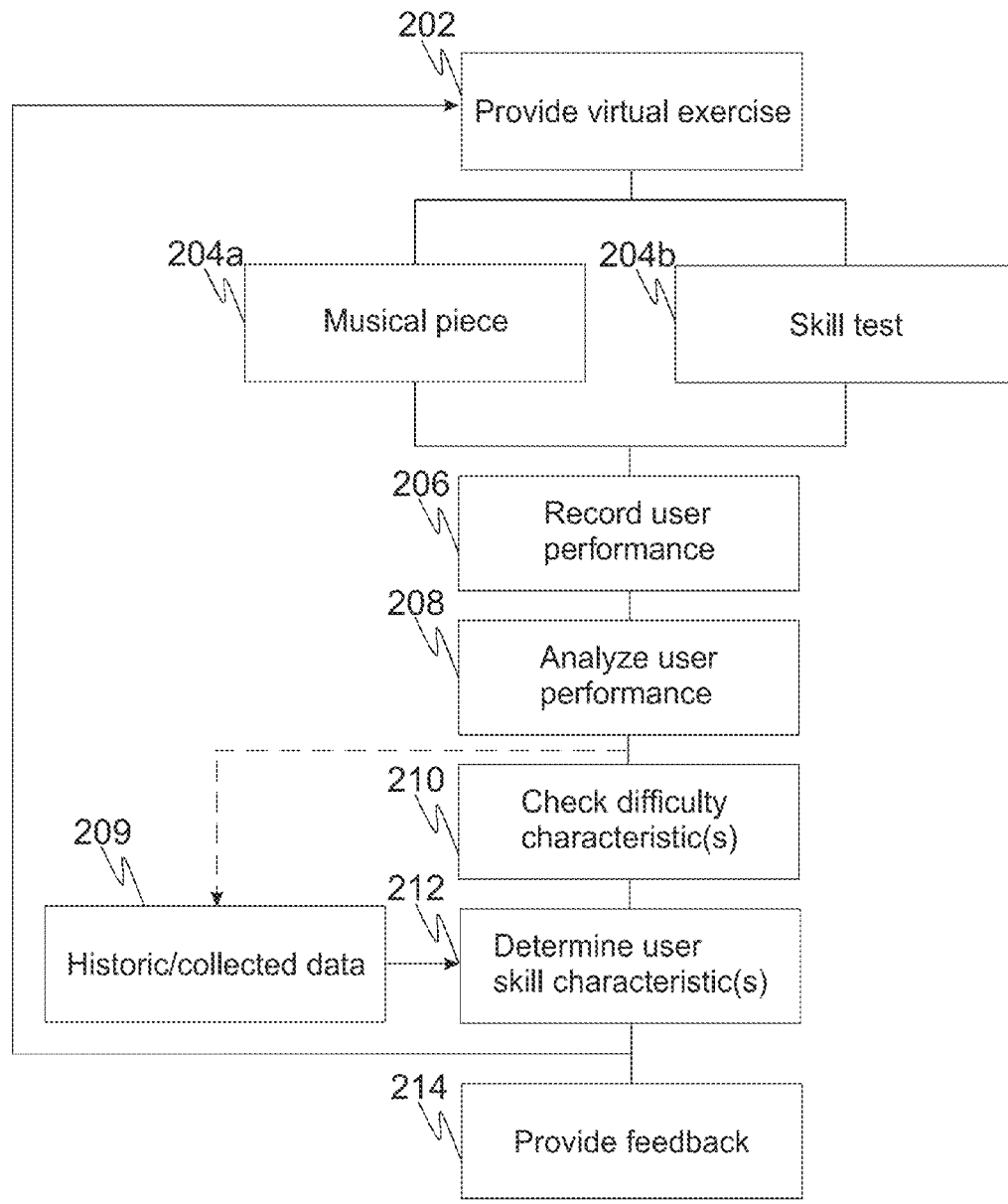
Figure 3A:
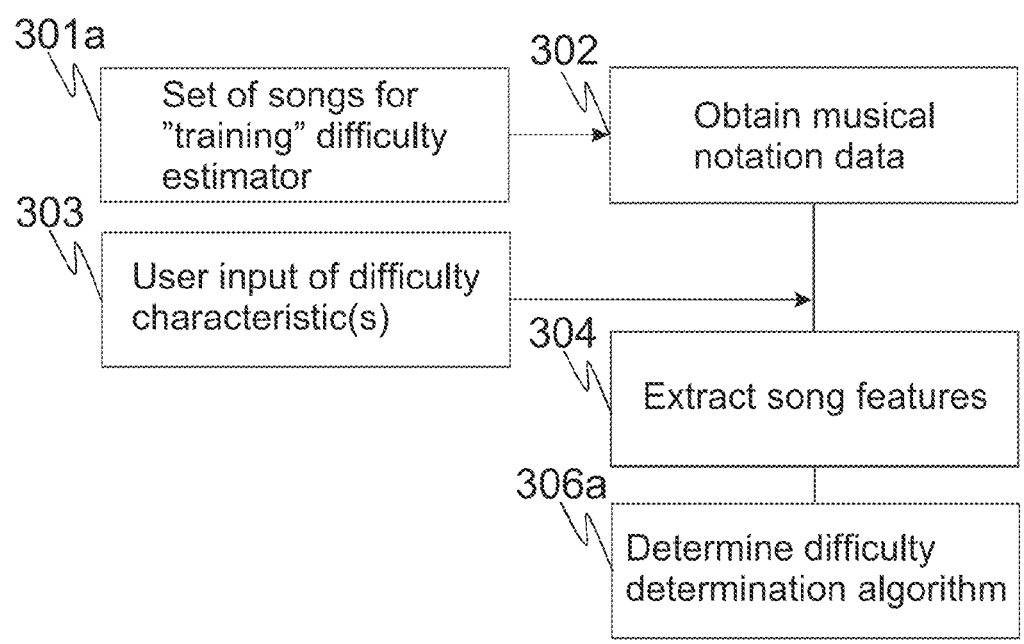
Figure 3B:
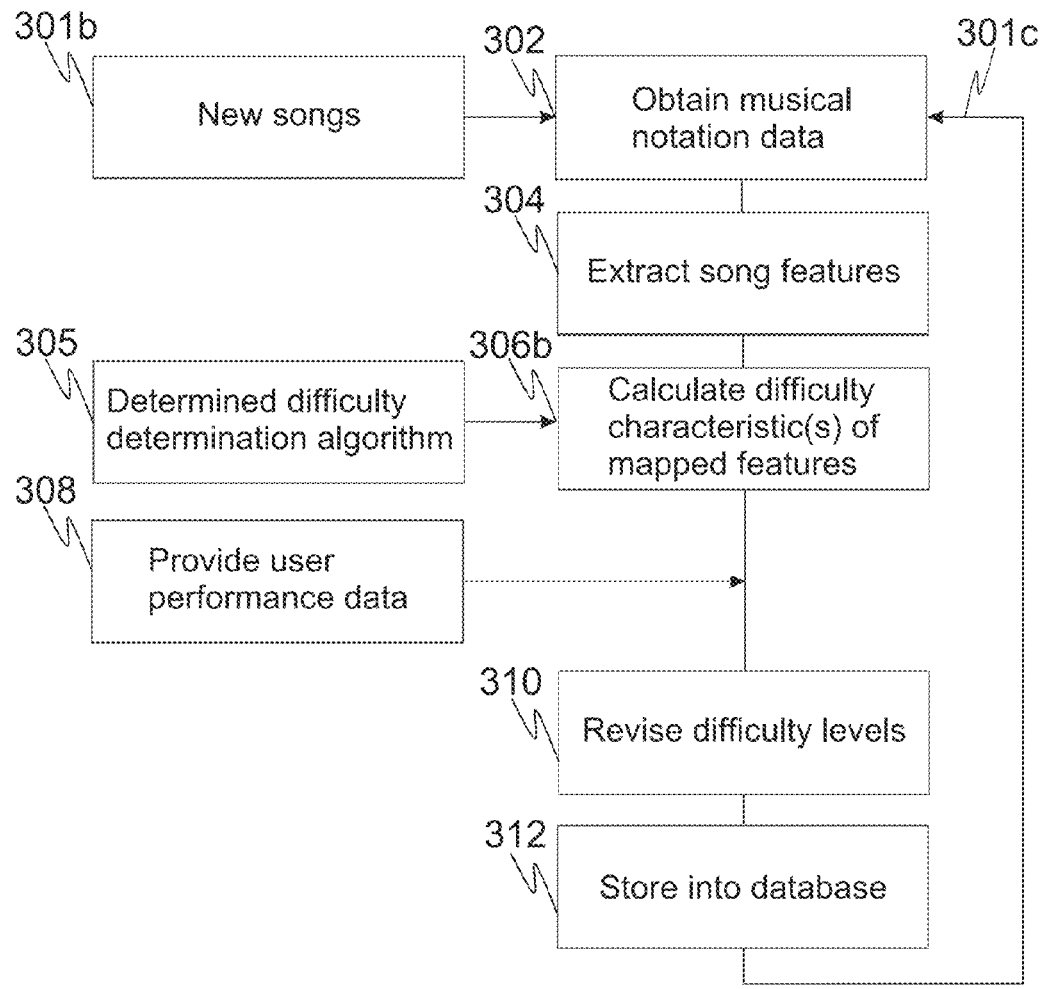
Figure 4:
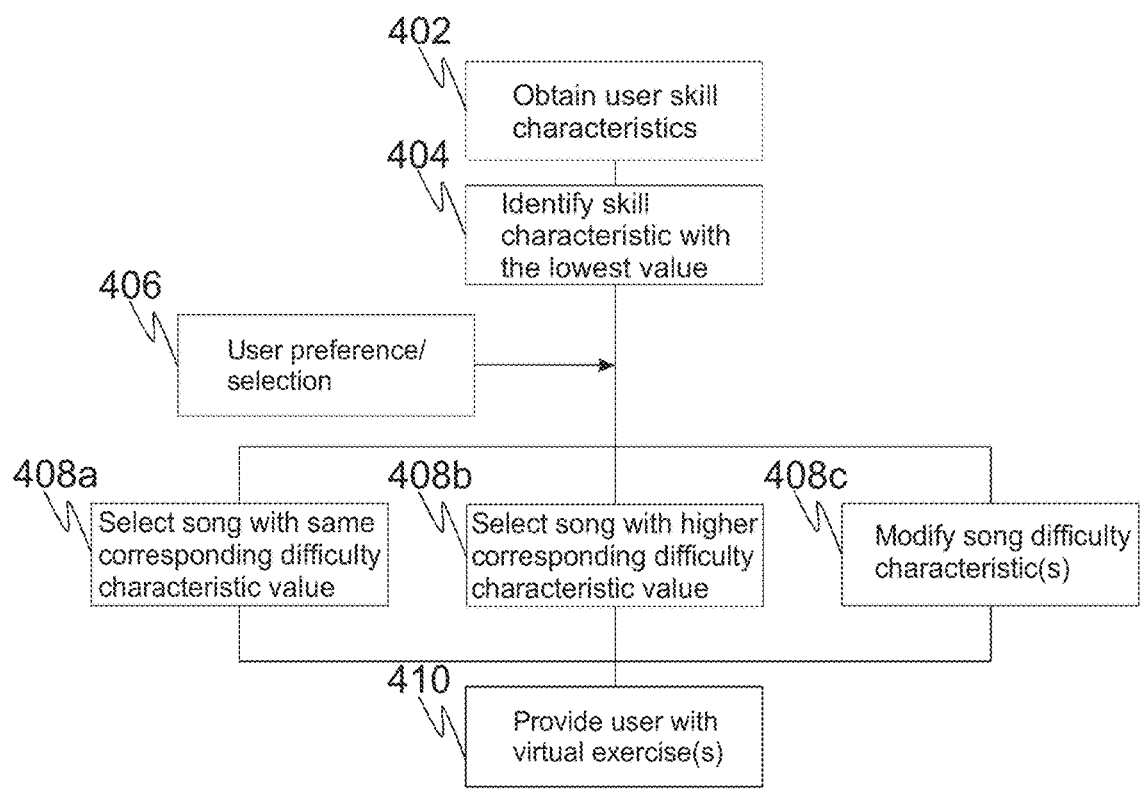

FIG. 2 is a flow diagram illustrating an embodiment of analyzing the user's performance and skill characteristics in accordance with the present invention, FIGS. 3a and 3b depict flow diagrams, wherein 3a illustrates the training stage and creation of the difficulty determination algorithm and 3b illustrates an embodiment of determining song difficulty characteristics utilizing a difficulty determination algorithm in accordance with the present invention, and FIG. 4 is a flow diagram illustrating an embodiment of determining a musical piece to be provided to the user as a virtual exercise in accordance with the present invention.

DETAILED DESCRIPTION OF THE EMBODIMENTS

FIG. 1 illustrates an embodiment of the system 100 in accordance with the present invention.

Reverting to the hardware-oriented illustration 101a of the system 100 some practicable hardware aspects of the present invention are shown in an exemplary manner. The system 100 comprises at least one processor element 102 such as one or more microprocessors, micro-controllers, DSP's (digital signal processor), programmable logic chips, etc. The processor 102 may be configured to execute the system functions and application code stored in a memory 104, which may imply processing instructions and data relative to a number of application(s) associated with the present invention. The memory 104 may be divided between one or more physical memory chips or other memory elements. The memory 104 may further refer to and include other storage media such as a preferably detachable memory card, a floppy disc, a CD-ROM, or a fixed storage medium such as a hard drive. The memory 104 may be non-volatile, e.g. ROM, and/or volatile, e.g. RAM, by nature.

A local UI 106 may be provided and comprise a display providing data visualization and optionally device control means, such as via touch screen means. In addition, the system comprises a data transfer entity 108 or interface including e.g. a wireless transceiver (e.g. GSM (Global System for Mobile Communications), UMTS (Universal Mobile Telecommunications System), WLAN (Wireless Local Area Network)) for communications with other devices and/or network infrastructure(s), and/or a wired data connectivity means (e.g. Ethernet interface) for the similar purposes. Obtaining and provision of musical notation content, performance data, etc., may be carried out using the data transfer means 108. Further data transfer and interface means may comprise digital audio input and output means, and optionally a Musical Instrument Digital Interface (MIDI). Further, in some embodiments audio input, such as mic-in or line-in, and audio output, such as a loudspeaker, means 109 may be used.

Reverting to the foregoing, software functions for instructing the underlying hardware to carry out the various procedures suggested herein may be implemented as one or more software applications executed by the processor. This computer software (product) may be thus provided on a carrier medium such as a memory card, a memory stick, an optical disc (e.g. CD-ROM, DVD, Blu-Ray™), or some other memory carrier.

The aforementioned hardware aspects may be comprised or constituted in any electronic device, such as an end user mobile or terminal device or remote entity.

Reverting to the high-level illustration 101b of the system 100 some practicable use case aspects of the present invention are shown in an exemplary manner. The system tasks may be e.g. hosted in a remote terminal device. By hosting we refer herein to receipt of musical notation data, receipt of user performance, provision of analyzed musical notation content to the users and execution of related analysis tasks, for example. The system 100 may comprise an electronic device 112 or a plurality of such devices 112. Said electronic devices 112 may be used to present the users with virtual exercises via GUI means and collect their playing via means for forming or receiving electrical signals corresponding to a number of acoustical sounds created by the user performing exercises with a music instrument 114. The electronic device 112 may constitute e.g. a computer or mobile computer whereas the instrument may be any suitable instrument whose sound may be received via line-in, MIDI or microphone means.

Further, the system 100 preferably comprises a remote entity 110 such as a cloud computing or remote server arrangement, comprising at least a database for performance data, obtained songs, etc. Optionally the system 100 may comprise a SaaS arrangement, web application, mobile application, facilitated via a browser or similar software, or as an API (application programming interface) wherein at least part of the processing entity functions may be executed at least partially remotely in said remote entity 110. The remote entity 110 may be arranged to process and/or analyze the data received and/or processed by the electronic device 112 and store it into the database and/or send it back to the electronic device 112. The database may further comprise instructions, exercises, program modes data collected from a number of the electronic devices 112. The database may be further used to provide the electronic devices 112 with updates and/or system functions.

The electronic devices 112 may communicate with a remote entity 110 to send and/or receive data, such as performance data, skill characteristic and profile data, difficulty data, user feedback, metadata (pertaining to the user, songs, scores, etc.). It is possible to implement the invention essentially in a stand-alone device, such as a computer or mobile device, without using a network connection or a server. However, the processing entity tasks may be divided or shared between the electronic device and remote entity for example when external processing is preferred. Hence the system in accordance with the present invention may be embodied as a single device and/or a computer network arrangement.

The system may also utilize a database of musical notation data content 116. Such databases may be e.g. external $3^{rd}$ party managed databases accessible via the Internet.

FIG. 2 is a flow diagram illustrating an embodiment of analyzing the user's performance and skill characteristics in accordance with the present invention. Some aspects of the method are known and may be more clearly found for example from the Yousician® application and related patent publications, such as the U.S. Pat. No. 9,218,748.

At 202, a virtual exercise is provided to the user and she is requested to perform it. The exercise may be provided on an electronic device via a display.

At 204a, the user is provided with a musical piece pertaining to a song. The means for determining a song to be provided to the user are depicted in detail with FIG. 4.

At 204b, instead of a song, the user is provided with a skill test. The skill test utilizes randomness: notes are either generated algorithmically or drawn semi randomly, via using probabilistic rules, from a large dictionary of manually crafted musical fragments. That ensures that the user sees the skill test exercise for the first time and optionally further that the user may only try the same exercise a few times. Similarly to exams and tests in other contexts, it is important that the user taking the test does not practice for the specific skill test exercise, which would be possible if the exercise would be public and fixed.

Additionally, the skill test may be configured to be non-uniform in difficulty, for example such that it gets gradually harder. For example, the frequency and/or amount of notes may be gradually increasing, such that the user has to play the notes increasingly faster.

Additionally, the skill test may include jumps to specific sections of the skill test exercise, depending on the user's performance and inbuilt logic of the skill test.

Additionally, the skill test may be interrupted automatically when the user's skill characteristic has been estimated or when the user can no longer cope with the material, i.e. when the success rate of the user performance decreases.

Different kinds of skill test can be produced, including the following:
1. A skill test that starts from a very easy level and gets gradually harder, in order to span a wide range of skills of different users and allow skill estimation for them.
2. A skill test that is tied to a certain skill characteristic. For example, passing the skill test at level L would mean that the particular user's skill characteristic is ≥L. In that case, the test would include material mainly from characteristic L only.

Furthermore, the aspects of skill being measured may vary. The skill test may be designed to involve a wide range of different factors of skill characteristics (rhythmic, tonal, motoric etc.) in order to determine the user's skill profile. Or, alternatively, one can produce a targeted skill test for a certain type of skill characteristic only (e.g. rhythmic skill).

Any mistakes/inaccuracies detected in the user's skill test performance are used to determine the user's skill characteristic and skill profile. The skill test is constructed in such a way that the positions of the mistakes (occurring at certain notes or chords) inform about the type of skill that was deficient. The skill test may also be included or constitute user performance.

At 206, the user's performance is recorded by means for forming or receiving electrical signals corresponding to a number of musical sounds created by the user playing according to the exercise with a music instrument. Such means may include a microphone, MIDI or a line-in audio cable.

At 208, the recorded performance is analyzed by a computational method, and compared against the target musical notation to detect any mistakes or inaccuracies in pitch content, timing, dynamics, and other factors in performing the sounds that make up the song. Also the locations of the mistakes/inaccuracies are detected: which events (notes, chords) were performed correctly or incorrectly, and what types of mistakes were made if any.

At, 209 the user performance may be stored to as historic user performance comprising at least part of the following:
1. The difficulty level and difficulty characteristics (constituting a difficulty profile) of a musical piece,
2. Any mistakes that the user made when performing the song,
3. The number of times the user performed the song before this performance, and
4. The calendar time when the performance(s) took place.
The abovementioned information is stored in the user's performance history. Based on her performance history, the user's skill characteristics and skill profile may be computed.

The users may also be allowed to give feedback and grade the performances of other users. This allows for evaluating user performances from a human viewpoint, in comparison to an objective comparison of difficulty and skill characteristic values or performance analysis of a song. This may be also used to evaluate the quality of improvised performances where the idea is not to play the exact notes and chords of the song but to take liberties within reasonable limits. An algorithm then calculates a "crowdsourced performance evaluation" based on several user-provided evaluations. In addition to a grade that a user has given other information, such as the skill characteristics of the user providing the grade, the total amount of grades or feedback evaluations provided by the user, the content or value of grades and date and time of when the grades have been given. Said additional information or metadata may be utilized by the algorithm that combines the grades given by several users, in order to give more weight to reliable evaluations. Hence, some users' feedback may be given more value than others whereas some feedback may be filtered as less- or non-relevant, such as spam or otherwise non-reliable feedback. This historic user performance data may be further used in determining current skill level and skill characteristics at 212.

At 210, the difficulty level and/or characteristics of the virtual exercise, i.e., the song or skill test, is checked (as it is preferably known essentially before or while providing it for the user).

At 212, the user skill characteristic values may be determined. The skill characteristic values of a user are defined by the corresponding difficulty characteristic values of musical pieces that she can perform. For example, if one of user's skill characteristic value is 10, she can play songs with corresponding difficulty characteristic value of up to 10 by merely familiarizing herself with the song in question and minimal practice, whereas songs with the corresponding difficulty characteristic value of >10 would require considerably more practice.

The user skill characteristics form a skill profile which is a vector of numbers (for example "4, 3, 7") that represents the skill of the user from the viewpoint of different areas of musical skill (for example: melodic skill 4, rhythmic skill 3, motoric skill 7). The skill profile of a user may be at least partially defined by the difficulty profile of the songs she can perform. For example, the user may be motorically skilled, but lack rhythmic skills, and therefore the respective characteristic values in the skill profile would be different. As a consequence, the user would be able to play songs that require high motoric skill, but she is likely to make mistakes in rhythmically difficult sections.

The skill scale, referring to the scale of the characteristic values, allows communicating the absolute skill characteristic value of a user, as opposed to merely comparing two users and saying that one is more skilled than the other. The range of the scale (for example 1 . . . 15) is also chosen such that the values are comparable for the skill scale and the difficulty scale.

One preferred exemplary technique for determining the different skill characteristic values of the user comprises the following: if the user is able to consistently perform songs with a particular difficulty characteristic value of N (e.g. making only few mistakes even when performing them for the first time) her corresponding skill characteristic value is determined to be ≥N. Similarly, if the user then consistently fails (makes many mistakes) when performing songs with another difficulty characteristic value of M, that corresponding skill characteristic of the user is determined to be <M.

Hence, the song difficulty characteristic values and difficulty profile may be used to determine user's different skill characteristic values and skill profile. For example, if the user is able to consistently perform well (with only few mistakes) songs where e.g. the "rhythmic skill characteristic" value of the song is 7, the "rhythmic skill characteristic" of the user's skill profile can be estimated to be ≥7.

Additionally, an important aspect of the aforementioned technique is that further information about the difficulty of individual events (notes, chords) in a particular song may be obtained as the amount of how much each individual event contributes to the difficulty characteristic value (and profile) of the musical piece may be obtained. On the basis of the information of 1) which musical events (notes/chords) a user has performed correctly and/or incorrectly and 2) what is the difficulty characteristic value of each individual note/chord, the underlying cause for making mistakes may be determined. Consequently these particular identified areas where the user has made mistakes may be determined to be skill areas where the user needs to develop her skills. In other words, the skill profile of the user may be estimated with only a short performance history by identifying the difficulty characteristic values of different events where the user made mistakes while performing.

At 214, the user may be provided feedback on her performance, both immediately (while performing) and/or as a summary at the end of the performance.

FIGS. 3a and 3b depict flow diagrams, wherein 3a illustrates the training stage and creation of the difficulty determination algorithm and 3b illustrates an embodiment of determining song difficulty characteristics utilizing a difficulty determination algorithm in accordance with the present invention. Whereas the diagram of FIG. 3a depicts a solution to train the difficulty determination algorithm with manually-annotated songs the diagram of FIG. 3b depicts how the difficulty profile of a musical piece is determined utilizing the determined difficulty determination algorithm.

The difficulty of a musical piece is represented in the system by a difficulty profile and optionally a difficulty level. Difficulty level is a single scalar value (one number) that tells how difficult the song is to perform. Larger numbers indicate higher difficulty. Some songs/exercises are more difficult to perform (play) than others. There can be various reasons for that: the number of notes per second may be relatively high and/or the temporal placement of the notes can be rhythmically difficulty and/or the notes to be played can be musically unpredictable and/or the notes are motorically (physically) difficulty to produce on the target instrument.

The difficulty profile is a vector of difficulty characteristic values (for example "5, 7, 3") that represents the difficulty of a musical piece from the viewpoint of the different aspects (characteristics) of difficulty. For example, the first characteristic value may represent "the difficulty of the song solely from the rhythmic viewpoint, ignoring all the other characteristics of difficulty". Similarly, the second characteristic value may represent the difficulty solely from the viewpoint of motoric difficulty, and so forth. There are several different difficulty characteristics and some of them are instrument-specific.

Difficulty/skill characteristics can include for example:
rhythmic difficulty: how irregularly musical notes and chords are located in time, and what is the "speed" of music (the rate at which notes/chords should be played),
motoric difficulty: how difficult it is physically to produce the musical sounds using a musical instrument. Usually mainly related to the complexity of the physical arrangement of user's fingers,
harmonic difficulty: how complex combinations of musical notes need to be played simultaneously (as chords) or sequentially (as very unpredictable melodies),
expressivity difficulty: does the user need to control and vary the loudness ("dynamics") and timbre ("tone colour") of the musical sounds being produced. How much and how often does the user need to vary those?

At 302, a musical piece is obtained. The musical piece may comprise e.g. a new (previously not obtained by the system) song 301a, 301b or a song, whose difficulty level and characteristics have been determined previously 301c.

The song difficulty is determined by a mathematical estimation model referred herein also as "difficulty determination algorithm", which algorithm is capable of determining the difficulty level and difficulty profile of a song automatically. The algorithm is utilized as follows:

At 303, the user annotates the at least one difficulty characteristic value (and profile) of a number of songs manually, which defines a difficulty scale. The difficulty characteristic values of the songs enable communicating their absolute and comparable difficulty characteristic values, as opposed to merely comparing two songs and saying that one is harder than the other. For example, the scale of a characteristic may extend from 1 (lowest difficulty) to 15 (highest difficulty). Ultimately, the scale is defined and calibrated by example songs for which the difficulty characteristics have been manually defined. Such examples "anchor" the scale: to communicate what "difficulty characteristic value 7" means, one can refer to example songs with the same difficulty characteristic value. Difficulty characteristics are typically instrument-specific: the difficulty characteristics of a given song can be very different depending on whether it has to be performed on the piano or the guitar.

At 304, the specific features that describe the individual events (notes and chords in their musical context) that make up the song are extracted. For example, the features describing a chord may e.g. include its temporal distance from nearest other event, the number of simultaneous notes in the chord, and other musical and instrument-specific attributes that contribute to the difficulty of playing the note or chord.

In addition, extracting features describing the song as a whole, for example the length of the song in seconds, the average number of notes per second, and other more musical features and more complex statistics.

At 306a, the difficulty determination algorithm is determined from the obtained plurality of manually annotated musical pieces to learn a difficulty determination algorithm that estimates at least one difficulty characteristic of the musical piece, optionally in relation to the mapped features of said musical piece.

At 305, the algorithm determined at 306a is provided for the system to calculate difficulty characteristic(s) of mapped features at 306b.

At 306*b*, the overall difficulty of the song is calculated by using the difficulty determination algorithm created at 306*a* utilizing the features extracted in 304. For example, a simple mathematical formula that only takes into account the "speed" of music (the rate at which notes should be played) would be as follows. Difficulty $D=(1/N) \Sigma n (1/T(n))$, where N is the total number of notes in the song, $T(n)$ is the temporal distance between note n and the note preceding it. Difficulty in that case is defined as the average of $1/T(n)$ calculated over the notes comprising the song, where $1/T(n)$ is the inverse of $T(n)$: short distances $T(n)$ between notes leading to large $1/T(n)$. More complex difficulty formulas involving more features can be used to achieve more accurate difficulty estimates. Such formulas can be found by utilizing machine learning algorithms that try to minimize the error between manually annotated difficulties and the estimated difficulties given by the mathematical formula being sought. The algorithms require training data: songs for which the difficulties have been annotated manually.

Further, the approach may be also applied to the different characteristics of the difficulty profile. When computing the characteristic values of the difficulty profile, the specific characteristic values of the manually annotated difficulty profiles (at 303) are used as the target value and the learned parameters are specific to each characteristic of the difficulty profile.

An important characteristic of the above-described approach to difficulty estimation is that, as a side product, information about the difficulty of individual events (notes, chords) in the musical notation may be obtained, since it may be inferred how much each individual event contributes to the difficulty of the overall song/exercise.

Further, for accuracy any of the difficulty characteristic values as well as the skill characteristic values may be given in the form of reported error margin e.g. "the difficulty characteristic value of a song S is 9.2±1.1" or "based on the information thus far, the skill characteristic value of user U is ≥5.3".

At 308, user performance data and feedback to improve song difficulty profile estimation and user performance evaluation in accordance with the present invention may be provided.

In addition to the estimation by the algorithm, user feedback may also be used in assessing song difficulty and user skill characteristics. More specifically, used feedback may be facilitated by allowing users to assess a song's difficulty e.g. by stating whether they think the song is more or less difficult than estimated.

Further, the system may utilize historic user performance information to improve the difficulty level and profile estimation and the algorithm for song simplification in accordance with the present invention.

The techniques that may be used for improving the estimation of song difficulty level and profile estimation comprise:

1. The amount of mistakes made by (large amount of) users when performing a particular song is correlated with the difficulty level of the song. Therefore statistics about the amount of performance mistakes may be collected and used to improve the difficulty profiles of songs that users have performed on the system. Such statistics may be collected from a number of users and it may be used to revisit and improve the difficulty profiles of song over time.
2. The amount of performance mistakes occurring at each individual musical event in the notation can be used to determine which events (notes, chords) in the song are the most difficult to perform. Those are the prime candidates for deletion or modification when producing a simpler version of the song.
3. Detecting inconsistencies in the estimated difficulty level (and profile) versus the actual amount of performance mistakes made by users, and then using those songs to a) detect shortcomings in the difficulty determination algorithm and/or difficulty estimation model of a song, and/or b) retrain the difficulty determination algorithm and/or difficulty estimation model of a song, after manually annotating the difficulty of that particular song. Besides detecting inconsistencies in the estimated song difficulty level (and profile), we can detect inconsistencies in the estimated difficulty level (and profile) of individual events (notes, chords) of the musical notation: if a certain event is estimated to be easy to perform, but many users make mistakes at it, an inconsistency may be determined and used as mentioned in a & b.

At 310, the aforementioned user feedback and user performance statistics may be further used to support the difficulty estimation model of a song since some songs may be less accurately estimated by a generic song difficulty estimation algorithm.

At 312, the determined difficulty characteristics are stored to be used later for revision at 301*c* and/or provision as virtual exercises for the users.

FIG. 4 is a flow diagram illustrating an embodiment of determining a musical piece to be provided to the user as a virtual exercise in accordance with the present invention.

At 402 user skill characteristics pertaining to her skill profile are obtained.

At 404, the user skill characteristics are analyzed and the unevenness as well as the lowest skill characteristic of the user are identified. In some cases, a user may have uneven skill characteristics, meaning that the user is weaker in some skill area(s) compared to the other areas. Consequently, the "weakest link" in her skill set tends to limit the range of songs that she can meaningfully perform. Even worse, some users tend to continue on the same path, playing the type of songs they are most comfortable with, which makes their skill profile increasingly skewed.

If the smallest value in the user's skill profile is N % below the median of other skill areas (or some other similar rule), that skill profile area may be flagged as an area of development for the user. Further, the user may be informed about her skill area that requires development and then recommended exercises that help her strengthen the particular skill area and overcome the weakness as has been discussed hereinbefore.

At 406, the user may provide input about their musical preference so that the musical piece may be determined from a group of suitable songs in accordance to items 408*a*, 408*b*, 408*c* in accordance with the user's genre or genres of interest. For example, the genre, artist, or other such characteristic, may be used to provide the user a selection of suitable songs wherein the user may choose from. This enables the user to input song or genre selections that they wish to play or like but cannot yet play.

At 408*a*, the user is determined a musical piece with a difficulty characteristic essentially the same or slightly below than the at least one user skill characteristic with the lowest value. Optionally this may be done in accordance with a target skill characteristic, which doesn't necessary need to be the lowest value skill characteristic of the user.

At 408*b*, the user is determined a musical piece with a difficulty characteristic essentially slightly higher than the at least one user skill characteristic with the lowest value. Optionally this may be done in accordance with a target skill characteristic, which doesn't necessary need to be the lowest value skill characteristic of the user. For example, if the user wants to develop her rhythmic skills, she may set a predetermined preference of rhythm skill characteristic on which songs that have rhythm difficulty characteristic above her skill characteristic are provided to her. Hence by practicing those songs she will strengthen that particular skill characteristic. For example, if the user is at skill characteristic value 7 in all other areas, but only at 5 in the area of rhythmic skill characteristic, she will benefit of practicing songs that are rhythmically at level 6 (slightly above her skill), but at level 7 or below in other areas in order not to challenge here in those other areas.

At 408c, the user is provided with a musical piece that is obtained by modifying the musical notation of a song so as to achieve a desired, lower difficulty level or difficulty profile. Songs may be simplified or otherwise altered (from their original arrangement form) to create versions that match the user's skill profile. This technique may be utilized e.g. to make a song simpler in number of its components and hence difficulty characteristics. Here we use the term reduction to refer to a systematically-generated version of a song that is easier to perform than the original song, but retains the essential features of the original song. Hence an effective way to allow the user to perform the target song directly is to automatically produce a reduction of the song that suits the user's skill level and profile. For example, a song may include a very difficult solo section where the melody is embellished with so-called grace notes that are short notes briefly preceding the other notes. Removing the grace notes will greatly simplify the song, but will not change it much musically. As another example, a song may involve non-standard and difficult versions of certain chords. Replacing those chords with simpler, standard versions of the same chords will make the song much easier to perform while minimizing amount of musical change.

Either of the items of 408a, 408b, 408c may also comprise recommending the user exercises gradually such that the difficulty profile characteristic corresponding to her weakest skill area gradually increases, starting from her current level in that area, and increasing step-by-step until that skill area is no longer her lowest in the skill profile. For example, the songs may be recommended to the user such that one difficulty characteristic increases whereas the other difficulty characteristics of the difficulty profiles of the songs do not increase, but may vary according to some other logic, however keeping the difficulty profile in those other areas equal to, or below, her current skill. Hence, the recommended song may in some instances be the same song as before but such that one of its difficulty characteristics has been increased.

Herein each difficulty characteristic of the song difficulty profile may be increased in relation to the user's skill characteristic and skill profile as the user progresses. Additionally, criteria in addition to the skill and difficulty characteristics may be used such as the user's musical genre of interest.

The system may also utilize a technique for recommending a song to the user, which comprises generating a plurality of different reductions, in terms of their skill profiles. The songs may be e.g. gradually simpler so that the gradually simpler versions of the song fall approximately on the line that connects the user's skill profile with the currently too difficult target song (e.g. the original form of the song). The user is then allowed to perform the simplified versions of the song and she can increase the difficulty characteristic level step-by-step to keep the level of challenge suitable, strengthening her skills along the way while performing those gradually harder versions of the song, until she has reached the level of the original song or is satisfied with the simplified version that she has reached so far.

At 410, the user is provided with the virtual exercise.

The system may utilize game-based learning techniques and link up users that have similar skill characteristic values and/or profiles. For example, the system may comprise arranging a multiplayer scenario wherein it is preferred that the users arranged to such setting as opponents are roughly on the same skill characteristic level. Also, the system may arrange the users to a multiplayer setting wherein the users can play together as a band. Depending on the situation, the skill levels and profiles of the users may be utilized together with other information such as the users' geographical location, musical taste or age. The system may also utilize social features, allowing the users to "make friends" with other users, which will help them follow each other's actions within the application, compete against each other on "friend high score lists", or challenge each other to practice. Linking up likeminded users on a similar skill level can be useful and further support learning via the system.

The system and the functions as illustrated with the aforementioned FIGS. 1, 2, 3, 4 and their respective descriptions may be stored as and executed by a computer program product embodied in a non-transitory carrier medium, such as optical disc or memory card.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. A system for providing a user with a virtual exercise in playing a music instrument in relation to the user's skill characteristics, the system comprising:
  a processing entity and a memory entity for processing and storing data, respectively to execute the system functions, and
  a data transfer entity for receiving and transmitting data, the system being thereby configured to:
  obtain musical notation data, comprising an ensemble of features, pertaining to a musical piece,
  analyze the obtained musical notation data to assign the musical piece, to which said data pertains, a number of difficulty characteristics with scalar values,
  provide the user with a number of musical pieces, whose difficulty characteristics are known, as virtual exercises to be completed by playing an instrument,
  obtain user performance data of completed virtual exercises,
  analyze the user performance data to determine and assign the user with a number of skill characteristics values in accordance with the difficulty characteristic values of the musical pieces of the completed virtual exercises, and
  determine a musical piece to be provided to the user as a virtual exercise in relation to the determined skill characteristics of the user,
  wherein analyzing the musical notation data comprises or is preceded by at least one item selected from the group consisting of:

obtain user input of difficulty characteristics of the obtained at least one musical piece, said user input comprising user-assigned values of difficulty characteristics of rhythmic, melodic, harmonic or technical difficulty of said at least one musical piece, map the note/interval/chord/timing events, from the notes, intervals, chords and timing of the musical notation data, to features representing factors that affect song difficulty and that enable calculation of song difficulty, aggregate said user input and mapping to manual annotation of a musical piece, obtain a plurality of manually annotated musical pieces to learn a difficulty determination algorithm that estimates at least one difficulty characteristic of the musical piece, optionally in relation to the mapped features of said musical piece, and assign at least one difficulty characteristic to a musical piece by extracting and/or mapping features from musical notation data pertaining to said piece, and utilizing difficulty determination algorithm to estimate at least one difficulty characteristic value.

2. The system of claim 1, comprising means for obtaining user performance data via an arrangement that comprises means for obtaining electric signals representing the user's playing on a musical instrument and comparing the obtained electric signals to the data pertaining to the virtual exercise.

3. The system of claim 1, wherein the user performance data comprises at least success rate and/or mistake rate of the user's playing in completing the virtual exercises.

4. The system of claim 1, wherein the musical notation data is obtained from a database or via user input.

5. The system of claim 1, wherein the system determines a musical piece to be provided to the user as a virtual exercise by selecting a musical piece that has at least one difficulty characteristic with lower, same or higher value as one of the user's corresponding skill characteristics, and wherein said skill characteristic is determined by the user.

6. The system of claim 1, wherein the system determines a musical piece to be provided to the user as a virtual exercise by selecting a musical piece that has at least one difficulty characteristic with the same value as one of the user's corresponding skill characteristics.

7. The system of claim 1, wherein the system determines a musical piece to be provided to the user as a virtual exercise by selecting a musical piece that has at least one difficulty characteristic with the same value as that of the user's corresponding skill characteristic with the lowest value.

8. The system of claim 1, wherein the system determines a musical piece to be provided to the user as a virtual exercise by selecting a musical piece that has at least one difficulty characteristic with a higher value than the user's corresponding skill characteristic value.

9. The system of claim 1, wherein the system determines a musical piece to be provided to the user as a virtual exercise by altering at least one difficulty characteristic of a musical piece to correspond to the user's corresponding skill characteristic value.

10. The system of claim 1, wherein the system determines a musical piece to be provided to the user as a virtual exercise by lowering the difficulty characteristics of a musical piece so that all of the difficulty characteristic values of said musical piece correspond to the user's corresponding skill characteristic values.

11. The system of claim 1, wherein the musical piece is assigned a genre characteristic.

12. The system of claim 1, wherein the musical piece to be provided to the user as a virtual exercise is determined in accordance with predetermined user-preferred genre characteristics.

13. The system of claim 1, configured to collect historic user performance data, optionally from a plurality of users, to identify common mistakes, by identifying features of a particular musical piece that have been performed correctly and features that have been performed incorrectly, to be used in revising the difficulty characteristics of the musical piece.

14. The system of claim 1, configured to provide the user with a skill test constituting a virtual exercise and comprising the ensemble of features, provided to the user to be performed seemingly randomly according to an algorithm or semi-random picking from a large dictionary of manually crafted musical fragments.

15. The system of claim 1, configured to determine a musical piece, from the analyzed musical notation data, to be provided as a virtual exercise to a plurality of users in relation to the determined difficulty characteristics of the musical piece and corresponding skill characteristics of the plurality of users.

16. The system of claim 1, wherein in said step of obtaining musical notation data, the ensemble of features include intervals and chords, pertaining to the musical piece.

17. The system of claim 11, wherein the genre characteristic is a scalar pertaining to a particular genre.

18. The system of claim 14, wherein the ensemble of features includes notes, intervals and chords.

19. A computer program product embodied in a non-transitory computer readable carrier or distribution medium comprising computer instructions that, when run on a computer, cause at least one processing entity to execute actions including:

obtain musical notation data, comprising an ensemble of features, such as notes, intervals and/or chords, pertaining to a musical piece, analyze the obtained musical notation data to assign the musical piece to which said data pertains a number of difficulty characteristics with scalar values, provide the user with a number of musical pieces, whose difficulty characteristics are known, as virtual exercises to be completed by playing an instrument, obtain user performance data of completed virtual exercises, analyze the user performance data to determine and assign the user with a number of skill characteristics values in accordance with the difficulty characteristic values of the musical pieces of the completed virtual exercises, and determine a musical piece to be provided to the user as a virtual exercise in relation to the determined skill characteristics of the user, wherein analyzing the obtained musical notation data comprises or is preceded by at least one item selected from the group consisting of:

obtain user input of difficulty characteristics of the obtained at least one musical piece, said user input comprising user-assigned values of difficulty characteristics of rhythmic, melodic, harmonic or technical difficulty of said at least one musical piece, map the note/interval/chord/timing events, from the notes, intervals, chords and timing of the musical notation data, to features representing factors that affect song difficulty and that enable calculation of song difficulty, aggregate said user input and mapping to manual annotation of a musical piece, obtain a plurality of manually annotated musical pieces to learn a difficulty determination algorithm that estimates at least one difficulty characteristic of the musical piece, optionally in relation to the mapped features of said musical piece, and assign at least one difficulty characteristic to a musical piece by extracting and/or mapping features from musical notation data pertaining to said piece, and utilizing difficulty determination algorithm to estimate at least one difficulty characteristic value.

\* \* \* \* \*